United States Patent
Izumi et al.

(10) Patent No.: US 6,214,199 B1
(45) Date of Patent: Apr. 10, 2001

(54) OZONE STORAGE/RECOVERY METHOD

(75) Inventors: Jun Izumi; Akinori Yasutake; Nariyuki Tomonaga; Hiroyuki Tsutaya, all of Nagasaki-ken (JP)

(73) Assignee: Mitsubishi Heavy Industries, LTD, Tokyo (JP)

(*) Notice: Subject to any disclaimer, the term of this patent is extended or adjusted under 35 U.S.C. 154(b) by 0 days.

(21) Appl. No.: 09/285,200

(22) Filed: Apr. 1, 1999

(30) Foreign Application Priority Data

Apr. 3, 1998 (JP) .................................................. 10-091814

(51) Int. Cl.$^7$ ....................................................... C25C 1/00
(52) U.S. Cl. ................ 205/626; 422/186.07; 422/186.11
(58) Field of Search ........................ 205/626; 422/186.07, 422/186.08, 186.11, 186.04

(56) References Cited

U.S. PATENT DOCUMENTS 5,770,033 * 6/1998 Murphy et al. ...................... 205/464
5,846,298 * 12/1998 Weist, Jr. .............................. 95/138

FOREIGN PATENT DOCUMENTS 03016638   1/1991   (JP).
06080404   3/1994   (JP).

OTHER PUBLICATIONS

English Abstract of JP 409156903A; Mine, Shingo; Published Jun. 17, 1997.*

* cited by examiner

*Primary Examiner*—Kathryn Gorgos
*Assistant Examiner*—Wesley A. Nicolas
(74) *Attorney, Agent, or Firm*—John P. White; Cooper & Dunham LLP

(57) ABSTRACT

An ozone storage/recovery method comprises a process for supplying an ozone-containing gas, generated by an ozone generator, to an ozone adsorbent tank filled with an ozone adsorbent contained at least one high-silica material selected from the group consisting of a high-silica pentasil zeolite, a dealumination faujasite and a mesoporous silicate, causing the adsorbent to adsorb ozone at a temperature of 0° C. or below, and storing the ozone, and a process for desorbing the ozone adsorbed by the adsorbent in the ozone adsorbent tank and recovering the ozone from the adsorbent tank, whereby ozone can be supplied as required.

10 Claims, 6 Drawing Sheets

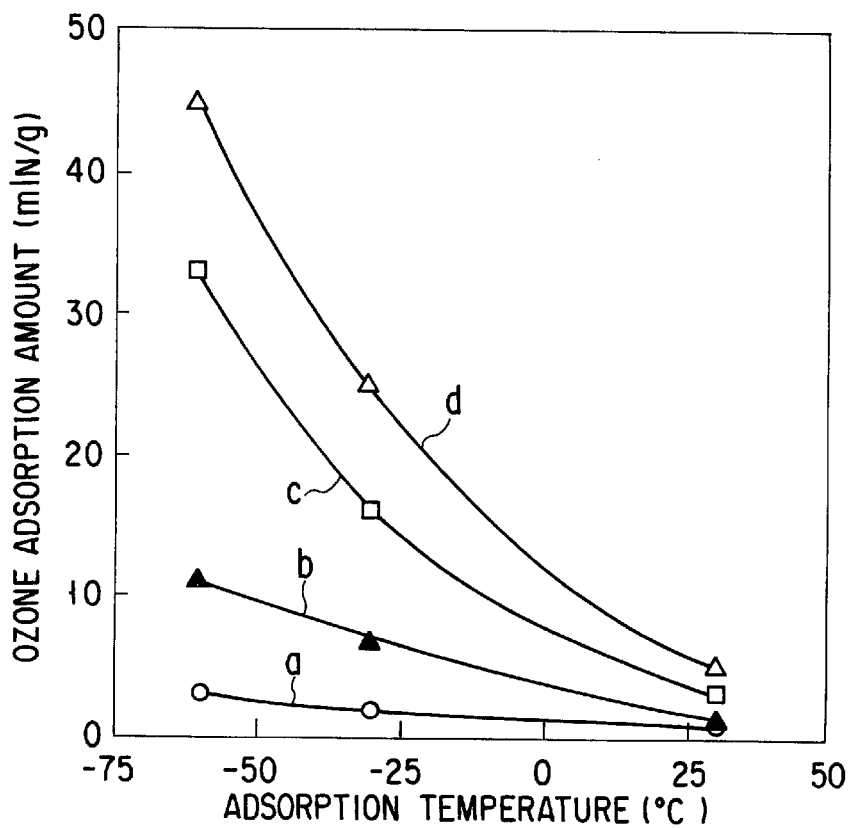
F I G. 5
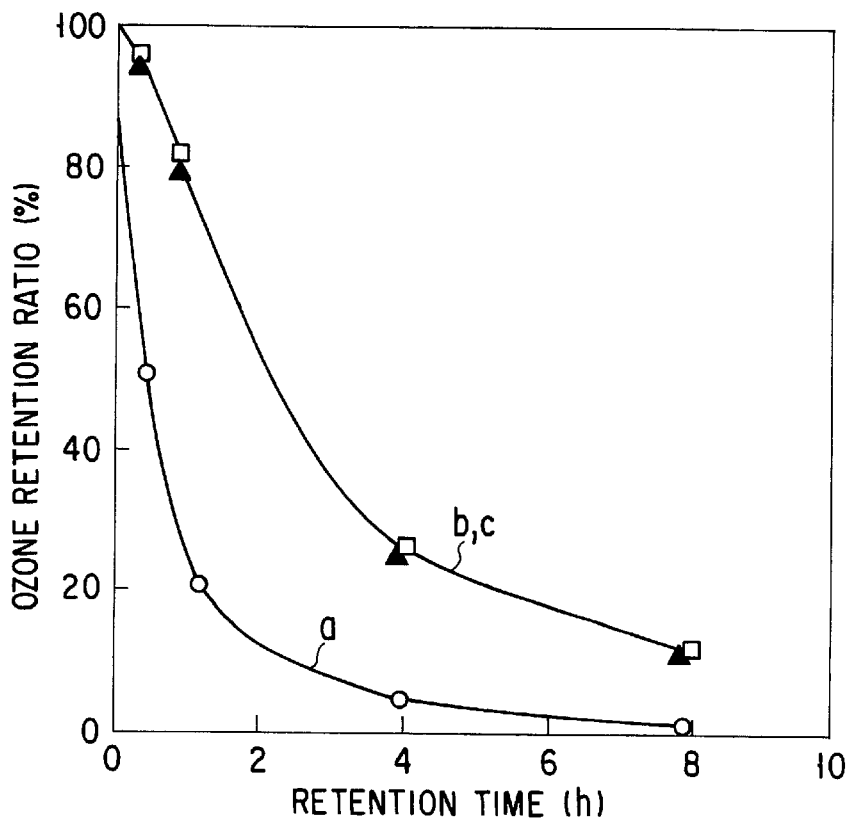
F I G. 6

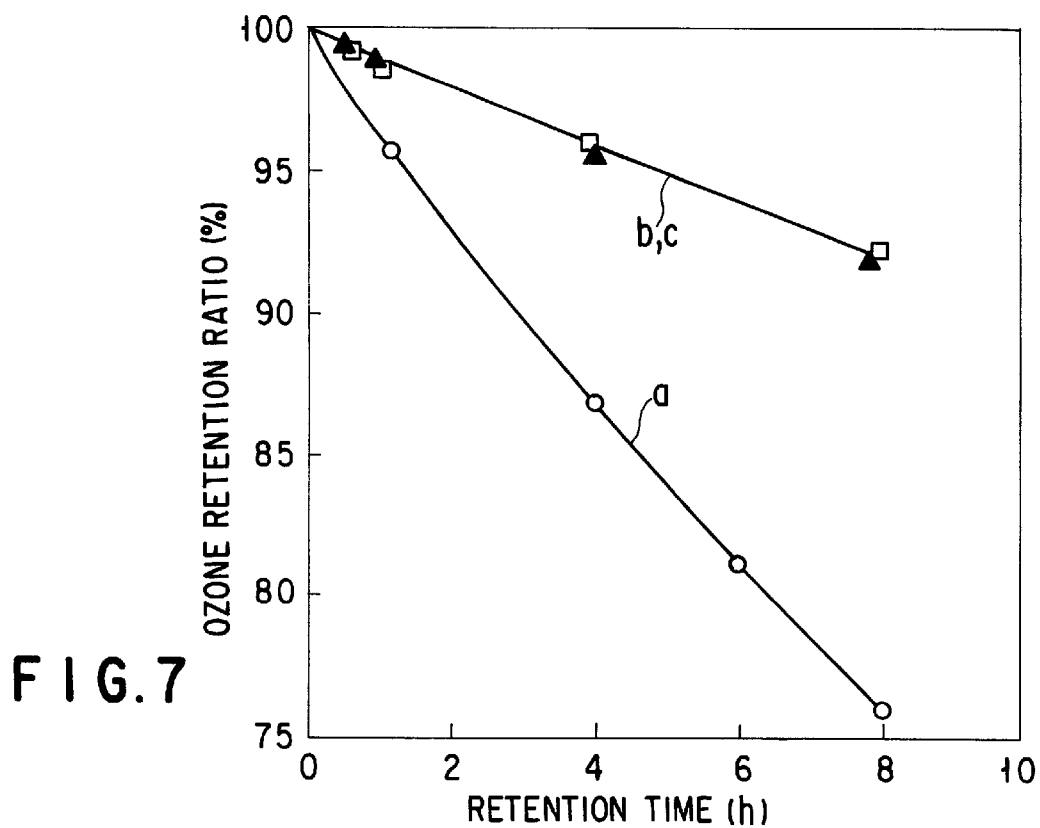
F I G. 7
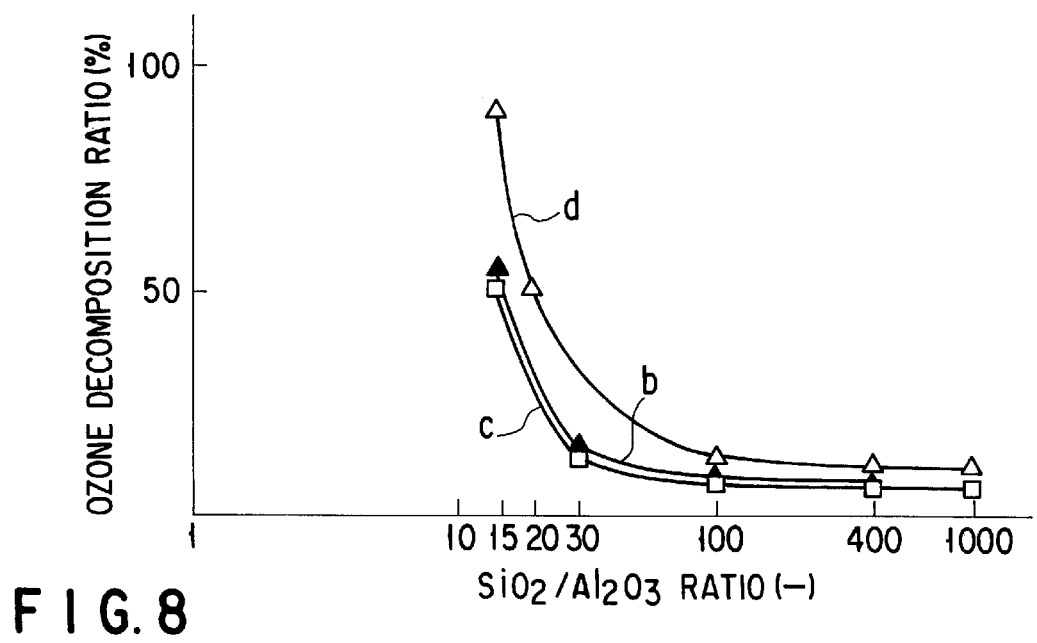
F I G. 8

OZONE STORAGE/RECOVERY METHOD

BACKGROUND OF THE INVENTION

The present invention relates to an ozone storage/recovery method and a system therefor, capable of generating ozone with use of low-priced night electricity in the main, storing it, and discharging it as required.

Ozone is a clean oxidizing agent that is free from secondary environmental pollution and easy to handle, and therefore, is widely used in the fields of sterilization, cleaning, oxidative bleaching, etc.

In general, however, ozone is decomposed so easily that it cannot be stored in a gas cylinder or the like. Conventionally, therefore, ozone is used hot from a silent-discharge ozone generator, ozone generator with an ultraviolet lamp, water-electrolysis ozone generator, etc.

More specifically, the ozone generator is installed on the scene of use, and ozone is obtained by operating the generator only when it is needed. According to this method, however, it is hard for users to cope with load fluctuations.

Ozone is produced by using the silent-discharge ozone generator or water-electrolysis ozone generator in the main. However, the cost of power supply for operating these generators accounts for a high percentage in the unit cost of ozone manufacture. Since the demand for ozone is restricted by time and fluctuates, on the other hand, there has been a request for the development of an ozone storage device from which an ozone-containing gas with a given concentration can be taken out as required.

To attain this, the gas may possibly be liquefied when it is stored into an adsorbent so that it can be taken out when needed. However, these storage methods have the following problems.

In general, ozone easily decomposes and liquefying it requires great energy, so that the liquefying method is impractical.

Silica gel is a well-known ozone adsorbent. Its ozone adsorptivity is so low. Also, the silica gel strongly adsorbs water, if any, in advance of ozone. Thus, water is stored in silica gel, so that the ozone adsorption amount is lowered correspondingly. Further, a sizable amount of ozone decomposes while it is being adsorbed by silica gel, so that the ozone recovery is reduced considerably. For the long run, furthermore, silica gel may possibly be powdered due to the adsorption of water. In consequence, the ozone storage apparatus that uses silica gel lacks in utility.

BRIEF SUMMARY OF THE INVENTION

An object of the present invention is to provide an ozone storage/recovery method, which uses an ozone adsorbent contained a specific high-silica material that has high ozone adsorptivity and high ozone retention ratio even in a watery system, whereby ozone can be produced with use of low-priced electricity, such as night electric power, stored, and recovered to be supplied when necessary.

Another object of the invention is to provide an ozone storage/recovery system, which can produce ozone with use of low-priced electricity, such as night electric power, store it, and when necessary, recover and supply it, thus enjoying lower running cost.

According to the invention, there is provided an ozone storage/recovery method, which comprises steps of:

a process for supplying an ozone-containing gas, generated by an ozone generator, to an ozone adsorbent tank filled with an ozone adsorbent contained at least one high-silica material selected from the group consisting of a high-silica pentasil zeolite, a dealumination faujasite and a mesoporous silicate, causing the adsorbent to adsorb ozone at a temperature of 0° C. or below, and storing the ozone; and a process for desorbing the ozone adsorbed by the adsorbent in the ozone adsorbent tank and recovering the ozone from the adsorbent tank.

According to the invention, moreover, there is provided an ozone storage/recovery system, which comprises:

an ozone generator;

an ozone adsorbent tank connected to the ozone generator by means of an ozone-containing gas supply pipe and filled with an ozone adsorbent contained at least one high-silica material selected from the group consisting of a high-silica pentasil zeolite, a dealumination faujasite and a mesoporous silicate;

a compressor and an on-off valve successively attached to the ozone-containing gas supply pipe from the ozone generator side;

an insulated container containing the adsorbent tank therein;

a cooler and a heater attached to the insulated container; and an ozone recovery duct having an on-off valve connected to the adsorbent tank.

According to the invention, furthermore, there is provided an ozone storage/recovery system, which comprises:

an ozone generator;

an ozone adsorbent tank connected to the ozone generator by means of an ozone-containing gas supply pipe and filled with an ozone adsorbent contained at least one high-silica material selected from the group consisting of a high-silica pentasil zeolite, a dealumination faujasite and a mesoporous silicate;

a compressor and an on-off valve successively attached to the ozone-containing gas supply pipe from the ozone generator side;

an insulated container containing the adsorbent tank therein;

a cooler attached to the insulated container;

a purging gas supply pipe connected to the absorbent tank;

an on-off valve and a heater successively attached to the purging gas supply pipe from the absorbent tank side; and an ozone recovery duct having an on-off valve connected to the adsorbent tank.

According to the invention, moreover, there is provided an ozone storage/recovery system, which comprises:

an ozone generator;

an ozone adsorbent tank connected to the ozone generator by means of an ozone-containing gas supply pipe and filled with an ozone adsorbent contained at least one high-silica material selected from the group consisting of a high-silica pentasil zeolite, a dealumination faujasite and a mesoporous silicate;

a compressor and an on-off valve successively attached to the ozone-containing gas supply pipe from the ozone generator side;

an insulated container containing the adsorbent tank therein;

a cooler attached to the insulated container;

an ozone recovery duct connected to the adsorbent tank; and an on-off valve and exhaust means successively attached to the ozone recovery duct from the absorbent tank side.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a graph showing relations between adsorption temperature and ozone adsorption amount for the various adsorbents used in Embodiment 1 of the invention;

FIG. 6 is a graph showing relations between retention time and ozone retention ratio for the various adsorbents used at an adsorption temperature of 25° C. in Embodiment 2 of the invention;

FIG. 7 is a graph showing relations between retention time and ozone retention ratio for the various adsorbents used at an adsorption temperature of –60° C. in Embodiment 2 of the invention;

FIG. 8 is a graph showing relations between $SiO_2/Al_2O_3$ ratio and ozone decomposition ratio for the various adsorbents in Embodiment 3 of the invention;

DETAILED DESCRIPTION OF THE INVENTION

Figure 1:
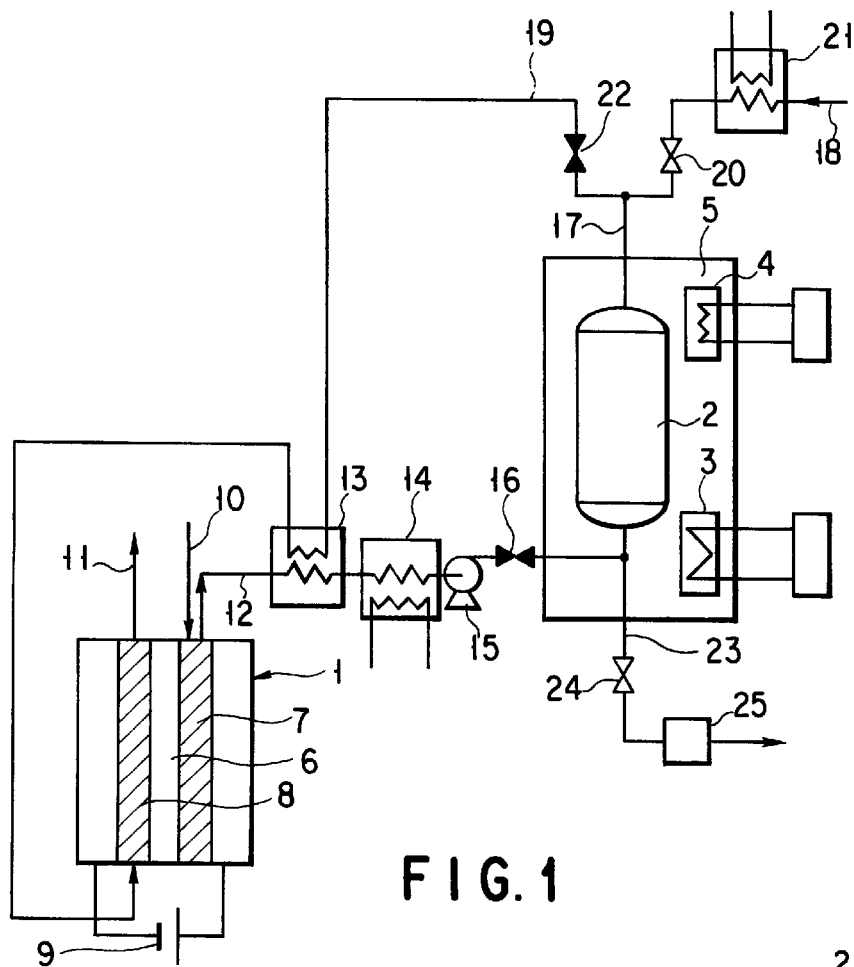
FIG. 1 is a schematic view showing an ozone storage/recovery system according to the present invention provided with a water-electrolysis ozone generator.

An ozone storage/recovery system according to the present invention will be described in detail with reference to the drawing of FIG. 1.

FIG. 1 is a schematic view showing the ozone storage/recovery system of the invention provided with a water-electrolysis ozone generator. This system mainly comprises a water-electrolysis ozone generator 1 and an insulated container 5 that contains an adsorbent tank 2 therein. A first cooler 3 and a first heater 4 are attached to the container 5.

The water-electrolysis ozone generator 1 is divided between an ozone-electrode chamber 7 and a hydrogen-electrode chamber 8 by an ion-exchange membrane 6, and its whole structure is held by means of a separator. In the ozone generator 1, electrolysis is effected by means of a DC power source 9 that is connected to electrodes in the chambers 7 and 8. A water supply pipe 10 is connected to the ozoneelectrode chamber 7. A hydrogen-gas outlet pipe 11 is connected to the hydrogen-electrode chamber 8.

The ozone generator 1 and the adsorbent tank 2 are connected by means of an ozone-containing gas supply pipe 12. One end of the pipe 12 is connected to the ozone-electrode chamber 7, and the other end to the bottom of the adsorbent tank 2. The tank 2 is filled with an ozone adsorbent, which will be mentioned later. The size of the tank 2 is determined in consideration of the usage of ozone and the total amount of ozone that is generated with use of low-priced night electricity, for example. The properties of the ozone adsorbent in the tank 2 are also taken into consideration in settling the tank size.

A heat exchanger 13, second cooler 14, compressor 15, and first on-off valve 16 are attached to the ozone-containing gas supply pipe 12, receding from the ozone generator 1 in the order named.

If there is a possibility of water freezing in the adsorbent tank 2 and lowering the quality of the adsorbent, the ozone-containing gas supply pipe 12 may be fitted additionally with a dehumidifier, e.g., a refrigerator-dehumidifier, which can minimize decomposition of ozone as it removes water.

A duct 17 is connected to the upper end of the adsorbent tank 2. The duct 17 diverges into two branches, a purging gas supply pipe 18 and a condensed oxygen gas circulating duct 19. A second on-off valve 20 and a second heater 21 are attached to the supply pipe 18, receding from the duct 17 in the order named. The other end of the circulating duct 19 is connected to the hydrogen-electrode chamber 8 of the ozone generator 1 via the heat exchanger 13. A third on-off valve 22 is attached to that portion of the circulating duct 19 which is situated near the duct 17.

An ozone recovery duct 23 diverges from that portion of the ozone-containing gas supply pipe 12 which is situated near the adsorbent tank 2. A fourth on-off valve 24 and an exhaust device 25 are attached to the duct 23, receding from the diverging point in the order named.

Another ozone storage/recovery system according to the invention will be described in detail with reference to the drawing of FIG. 2. This system is provided with a silent-discharge device as an ozone generator. Like reference numerals refer to like members in FIGS. 1 and 2, and a repeated description of those members is omitted.

This ozone storage/recovery system is provided with a silent-discharge ozone generator 31. The generator 31 is connected to an adsorbent tank 2 through an ozone-containing gas supply pipe 12.

If necessary, a temperature-swing oxygen condenser (or thickness-swing oxygen condenser) 33 having an oxygen supply pipe 32 is located on the upper-stream side of the ozone generator 31, and is connected to the generator 31 by means of a condensed oxygen gas duct 34. The other end of a condensed oxygen gas circulating duct 19 is connected to the duct 34 through a heat exchanger 13.

Figure 2:
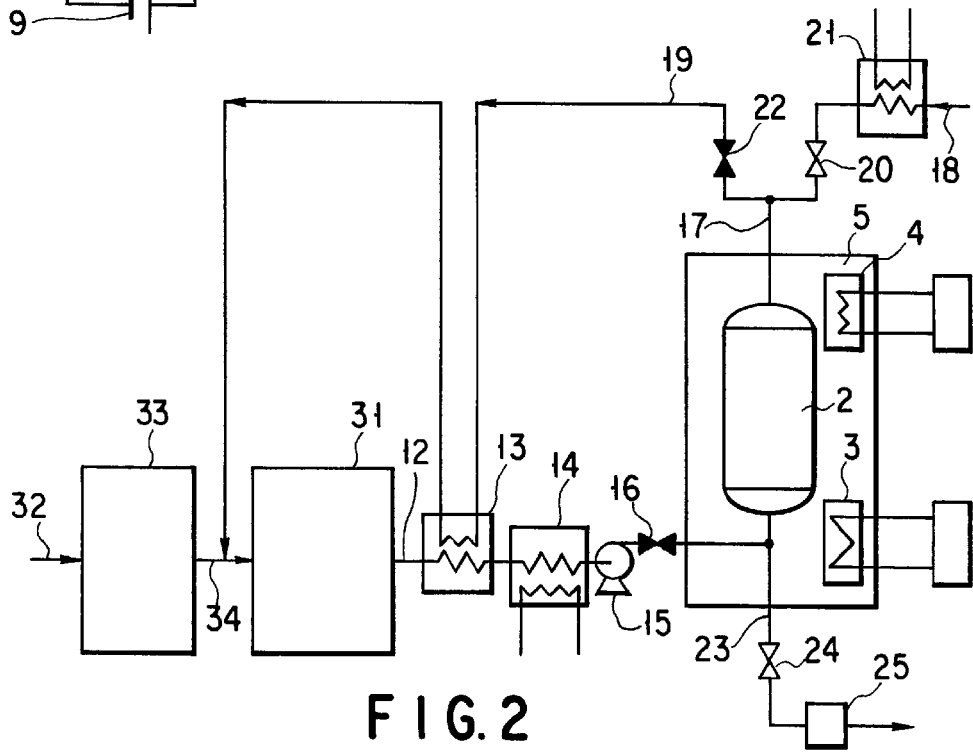
FIG. 2 is a schematic view showing another ozone storage/recovery system according to the invention provided with a silent-discharge ozone generator.

In each of the ozone storage/recovery system shown in FIGS. 1 and 2, the ozone adsorbent in the adsorbent tank 2 contained at least one high-silica material selected from the group consisting of a high-silica pentasil zeolite, a dealumination faujasite and a mesoporous silicate. Since the ozone adsorbent has high ozone adsorptivity even in a watery system, the ozone storage amount per usage can be increased, and the storage device size can be reduced. Since the adsorbent has a high ozone retention ratio, moreover, ozone can be stably stored without a loss that is attributable to decomposition.

Examples of high-silica pentasil zeolites are silicalite or ZSM-5 (commercially available from Mobil Oil Corp.) having a high $SiO_2/Al_2O_3$ ratio). Examples of dealumination faujasites are ultra stable Y-type zeolites (USYs). Examples of and mesoporous silicates are MCM-41 (commercially available from Mobil Oil Corp.), FSM-16 (commercially available from Toyota Chuo Kenkyusho, Japan), low temperature acidically synthesized mesoporous silicates prepared by using tetraethoxy silane as a silica source, which are hereinafter referred to as "low temperature mesoporous silicates I", or low temperature acidically synthesized mesoporous silicate prepared by using a low molecular weight silicic acid as a silica source, which are hereinafter referred to as "low temperature mesoporous silicate II"). Any of these high-silica materials is commercially available.

The high-silica pentasil zeolites have a $SiO_2/Al_2O_3$ ratio of about 10 to 100, and can be obtained by a hydrothermal synthesis at about 150 to 180° C., using sodium silicate or fumed silica as a silica source, aluminum sulfate as an aluminum source, and tetrapropylammonium bromide as an organic template.

The dealumination faujasites are ultra stable Y-type zeolites (USY) having a $SiO_2/Al_2O_3$ ratio of about 10 to 400, and can be obtained by treating a Na-Y type zeolite having a $SiO_2/Al_2O_3$ ratio of about 5 with ammonia water to remove a major portion of Al included in the zeolite skeleton.

The mesoporous silicates are silica-based porous body having meso holes of 10 to 1,000 angstroms, and can be prepared by various methods. By controlling the manufacturing conditions, a $SiO_2/Al_2O_3$ ratio of the mesoporous silicates can be varied over a wide range, e.g., from those having a $SiO_2/Al_2O_3$ ratio of about 10 to those substantially consisting of $SiO_2$ alone. For example, MCM-41 is a silica-based porous body having a specific surface area of about 1600 $m^2/g$ and a $SiO_2/Al_2O_3$ ratio of about 1000, and can be obtained by a method developed by Mobil Oil Corp. (see U.S. Pat. Nos. 5,378,440; 5,364,797; and 5,348,687, as well as C. T. Kresge, M. E. Leonowiez, W. J. Roth, J. C. Vartuli and J. S. Beck, Nature, 359, 710 (1992)). Specifically, the reaction may be carried out at 140° C. under a pH of 13.5 among water glass or sodium silicate used as a silica source, aluminum sulfate as an aluminum source and a cationic surfactant (having at least 8 carbon atoms) used as an organic template so as to obtain MCM-41. FMS-16 is a silica-based porous body having a chemical structure similar to that of MCM-41 and having a $SiO_2/Al_2O_3$ ratio of about 1000. The material can be prepared by intercalation between kanemite developed by Kuroda, Inagaki, et al. (see JP 8067578, and S. Inagaki, Y. Fukushima and K. Kuroda, J. Chem. Soc., Chem. Commun., 680 (1993)) and a cationic surfactant. The low temperature mesoporous silicates I can be synthesized by a method proposed by Stucky et al. (see Q. Huo, D. I. Margolese, U. Ciesla, D. G. Demuth, P. Peng, T. E. Gier, P. Siger, A. Firouzi, B. F. Chmelka, F. Schuth and G. D. Stucky, Chem. Mater., 6, 1176 (1994). Specifically, the material can be obtained by the reaction at room temperature and a pH of 1 or less among tetraethoxy silane (TEOS) used as a silica source, aluminum sulfate as an aluminum source and a cationic surfactant used as an organic template. Further, the low temperature mesoporous silicates II can be prepared by a method described in Y. M. Setoguchi, Y. Teraoka, I. Moriguchi, S. Kagawa, N. Tomonaga, A. Yasutake, and J. Izumi, Jounal of Porous Materials, 4, 129–134 (1997). Specifically the material can be prepared by the reaction at room temperature and a pH of 1 or less among silicic acid, which does not contain a polycondensed silica and is used as a silica source, aluminum sulfate used as an aluminum source and a cationic surfactant used as an organic template. By controlling the reaction conditions, a $SiO_2/Al_2O_3$ ratio of the mesoporous silicate can be varied over a wide range, from those having a $SiO_2/Al_2O_3$ ratio of about 10 to those substantially consisting of $SiO_2$ alone.

The present inventors have experimentally found that, among the high-silica materials, high-silica pentasil zeolites having a $SiO_2/Al_2O_3$ ratio of 70 or more, dealumination faujasites having a $SiO_2/Al_2O_3$ ratio of 20 or more and mesoporous silicates having a $SiO_2/Al_2O_3$ ratio of 20 or more exhibit a high ozone adsorbing capability, suppress decomposition of the adsorbed ozone and, thus, can be used as preferred adsorbents. Among these high-silica materials, the high-silica pentasil zeolites, which certainly exhibit a high ozone adsorbing capability, tend to be somewhat high in the ozone decomposition rate. In view of both the ozone adsorption capability and the ozone decomposition rate, mesoporous silicates having a $SiO_2/Al_2O_3$ ratio of 20 or more provide the most satisfactory adsorbent. Then, dealumination faujasites having a $SiO_2/Al_2O_3$ ratio of 20 or more and high-silica pentasil zeolites having a $SiO_2/Al_2O_3$ ratio of 70 or more follow the mesoporous silicates in the order mentioned.

These ozone adsorbents can be used singly or in the form of a mixture and can be formed into an optional shape, i.e., can be shaped like grains, pellets, Raschig rings, honeycombs, etc., depending on the purpose of the use.

An ozone storage/recovery method according to the invention will now be described with reference to FIG. 1.

(1) Storage of Ozone

First, the first and third on-off valves 16 and 22 are opened, while the second and fourth on-off valves 20 and 24 are closed. The first cooler 3 of the insulated container 5 is operated to cool the ozone adsorbent in the adsorbent tank 2 to a temperature of 0° C. or below. For example, the water-electrolysis ozone generator 1 is operated to produce hydrogen and an ozone-containing gas in the hydrogen- and ozone-electrode chambers 8 and 7, respectively, by utilizing low-priced night electricity. The compressor 15 is actuated to supply the ozone-containing gas to the adsorbent tank 2 through the ozone-containing gas supply pipe 12. As this is done, ozone in the ozone-containing gas can be adsorbed satisfactorily by means of the ozone adsorbent, since the adsorbent contains the high-silica material such as high-silica pentasil zeolite that brings out high ozone adsorptivity at 0° C. or below and 1 atm. or above. The high-silica material can adsorb and retain ozone for a relatively long time after the ozone is adsorbed at 0° C. or below.

After the ozone is adsorbed in the adsorbent tank 2, a condensed oxygen gas with a low temperature is discharged through the duct 17 and the condensed oxygen gas circulating duct 19. As this is done, the ozone-containing gas in the ozone-containing gas supply pipe 12 can be precooled by passing the condensed oxygen gas through the heat exchanger 13 that is attached to the pipe 12. Thus, the speed of adsorption by means of the adsorbent in the adsorbent tank 2 can be improved. By connecting the supply pipe 12 to the hydrogen-electrode chamber 8 of the water-electrolysis ozone generator 1 so that the condensed oxygen gas can be returned to the chamber 8 to react with hydrogen therein, moreover, oxygen depolarization can be accelerated to reduce power consumption in the ozone generator 1.

During the ozone adsorption in the adsorbent tank 2, the ozone that flows in the ozone-containing gas supply pipe 12 can be precooled by operating the second cooler 14 that is attached to the pipe 12. Accordingly, a temperature (0° C. or below) that suits the ozone adsorption by the adsorbent can be reached in a short time. Thus, the speed of adsorption by means of the adsorbent in the adsorbent tank 2 can be improved further.

If the temperature exceeds 0° C. during the ozone adsorption in the adsorbent tank 2, it is hard to adsorb sufficient ozone by means of the ozone adsorbent. Preferably, the lower limit of the temperature for adsorption should be adjusted to —100° C. in consideration of the running cost and the like. Most preferably, the ozone adsorbent temperature for adsorption ranges from –60° C. to –30° C.

(2-1) Ozone Recovery: Ozone Desorbing Method Based on Temperature Rise

After a given amount of ozone is adsorbed by means of the ozone adsorbent in the adsorbent tank 2, the operations of the water-electrolysis ozone generator 1, the compressor 15, and the first cooler 3 of the insulated container 5 are first stopped. In the case where the second cooler 14 of the ozone-containing gas supply pipe 12 is used, its operation is also stopped. The first, second, and third on-off valves 16, 20 and 22 are closed, while the fourth on-off valve 24 is opened.

In this state, the first heater 4 of the insulated container 5 is operated to adjust the ozone adsorbent in the adsorbent tank 2 to a temperature from above 0° C. to 30° C. Thereupon, ozone is desorbed from the ozone adsorbent by which the ozone is previously adsorbed. The desorbed ozone is recovered through the ozone recovery duct 23.

If the temperature of the ozone adsorbent is lower than 0° C. in the ozone desorption process, it is hard to desorb ozone satisfactorily from the adsorbent. If the adsorbent temperature is higher than 30° C., on the other hand, the adsorbent, which contains high-silica pentasil zeolite or the like, may possibly be deteriorated.

(2-2) Ozone Recovery: Ozone Desorbing Method Using Purging Gas

After the operations of the individual members for ozone storage are stopped in the same manner as in (2-1), the first and third on-off valves 16 and 22 are closed, while the second and fourth on-off valves 20 and 24 are opened.

In this state, the second heater 21 of the purging gas supply pipe 18 is actuated. A desired purging gas is flowed through the pipe 18, heated by means of the second heater 21, and supplied to the adsorbent tank 2 through the duct 17. As this is done, the ozone adsorbent in the tank 2 is heated to a temperature from above 0° C. to 30° C. In consequence, ozone is desorbed from the ozone adsorbent by which the ozone is previously adsorbed. The desorbed ozone is recovered through the ozone recovery duct 23.

In the ozone desorption process described above, the speed of ozone desorption can be increased by operating the first heater 4 of the insulated container 5 to heat the ozone adsorbent in the adsorbent tank 2 in advance.

The purging gas is selected according to the purpose of use. For example, dry air, nitrogen gas, or helium gas may be used as the purging gas.

Although the purging gas is effective for the acceleration of ozone desorption, ozone is diluted in proportion to the quantity of the purging gas used. Preferably, the purging ratio should be selected within the range of 1 to 2 compared to the recovered ozone in consideration of the ozone desorption efficiency. In the case where the purging gas can be selected according to the purpose of use, the purging ratio may be selected so that the ozone concentration matches the mode of use.

(2-3) Ozone Recovery: Ozone Desorbing Method Based on Pressure Reduction

After the operations of the individual members for ozone storage are stopped in the same manner as in (2-1), the first, second, and third on-off valves 16, 20 and 22 are closed, while the fourth on-off valve 24 is opened.

In this state, the exhaust device 25 in the ozone recovery duct 23 is operated to discharge the gas from the adsorbent tank 2, thereby decompressing the tank 2 to a reduced pressure of 0.3 atm or below. As this is done, ozone is desorbed from the ozone adsorbent by which the ozone is previously adsorbed, as indicated by curves in FIG. 4 that shows relations between ozone partial pressure and ozone adsorption amount. The desorbed ozone is recovered through the ozone recovery duct 23.

In the ozone desorption process described above, the speed of ozone desorption can be increased by opening the second on-off valve 20 so that a desired purging gas is supplied to the adsorbent tank 2 through the purging gas supply pipe 18 and the duct 17.

In the ozone desorption process, moreover, the speed of ozone adsorption can be further increased by opening the second on-off valve 20, actuating the second heater 21, circulating the desired purging gas through the purging gas supply pipe 18, heating the gas by means of the second heater 21, and then supplying the gas to the adsorbent tank 2 through the duct 17.

If the pressure in the adsorbent tank 2 is raised to a high level that exceeds 0.3 atm. in the ozone desorption process, it is hard to desorb ozone satisfactorily from the adsorbent. Preferably, the lower limit of the pressure for desorption should be adjusted to 0.04 atm. in consideration of the running cost and the like.

The storage and recovery of ozone by means of the ozone storage/recovery system with the silent-discharge device shown in FIG. 2 are effected by basically the same methods as the storage method (1) and the recovery methods (2-1) to (2-3). Oxygen can be effectively utilized by supplying the condensed oxygen from the ozone adsorbent tank 2 to the condensed oxygen gas duct 34 on the upper-stream side of the silent-discharge ozone generator 31 through the condensed oxygen gas circulating duct 19.

According to the invention described above, there may be provided an ozone storage/recovery method, which uses the adsorbent tank filled with the ozone adsorbent that contains a specific high-silica material having high ozone adsorptivity and high ozone retention ratio even in a watery system, whereby ozone can be produced with use of low-priced electricity, such as night electric power, stored, and efficiently recovered to be supplied when necessary.

According to the invention, moreover, there may be provided an ozone storage/recovery system with a simple construction, which can produce ozone with use of low-priced power, such as night electric power, store it, and efficiently recover and supply it as required.

The following is a detailed description of preferred embodiments of the present invention.

Figure 3:
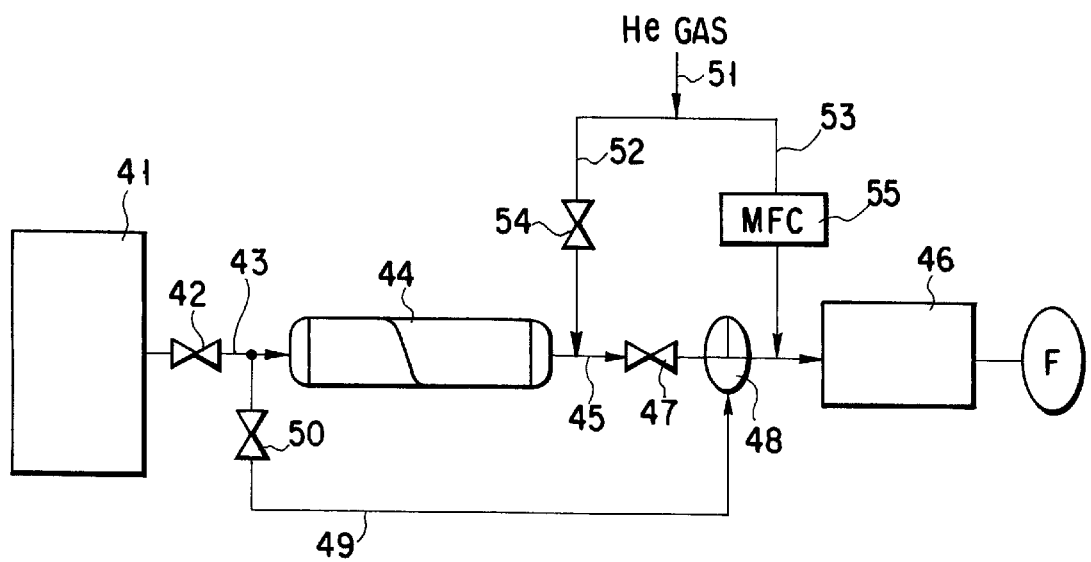
FIG. 3 is a schematic view showing a tester for ozone adsorption characteristics used in several embodiments of the invention.

FIG. 3 is a schematic view showing an ozone tester used in the embodiments described below. A water-electrolysis ozone generator 41 is connected to an adsorbent container 44 through a duct 43 that is fitted with a first valve 42. The container 44 is connected to an ozone analyzer 46 by means of a duct 45. A second valve 47 and a three-way valve 48 are successively attached to the duct 45 from the side of the container 44. One end of a bypass duct 49 is connected to that portion of the duct 43 which is situated between the first valve 42 and the container 44, and the other end to the three-way valve 48. A third valve 50 is attached to the bypass duct 49. A helium gas duct 51 diverges in the middle. A first branch duct 52 is connected to that portion of the duct 45 which is situated between the container 44 and the second valve 47. A second branch duct 53 is connected to that portion of the duct 45 which is situated between the three-way valve 48 and the ozone analyzer 46. A fourth valve 54 is attached to the first branch duct 52. A mass-flow controller 55 is attached to the second branch duct 53.

Embodiment 1

The ozone adsorption amount was measured using a high-silica pentasil zeolite ($SiO_2/Al_2O_3$ ratio=200), a dealumination faujasite ($SiO_2/Al_2O_3$ ratio=70), and a dealumination faujasite ($SiO_2/Al_2O_3$ ratio=1,000). Commercially available silica gel was also used for comparison.

An ozone-containing gas for testing was generated by means of the water-electrolysis ozone generator 41 of the tester shown in FIG. 3. This gas contains 10 vol % of $O_3$, 87 vol % of $O_2$, and 3 vol % of $H_2O$. The adsorbent container 44 was filled with 5 g of the ozone adsorbent.

First, the ozone adsorbent in the adsorbent container 44 was kept at 25° C. The respective openings of the first and second valves 42 and 47 were adjusted to set the ozone partial pressures of the ozone-containing gas at 0.1 atm. and 1 atm. The gas was introduced into the container 44 through the duct 43, and ozone in the gas was adsorbed by means of the ozone adsorbent. The gas discharged from the container 44 was introduced into the ozone analyzer 46 through the duct 45, and the ozone concentration was measured by means of the analyzer.

After ozone was detected by means of the ozone analyzer 46 and saturation of the ozone adsorbent was confirmed, the first and second valves 42 and 47 were closed, the third and fourth valves 50 and 54 were opened, and the three-way valve 48 was rotated so as to communicate with the duct 45. Helium gas was supplied to the adsorbent container 44 through the duct 51 and the first branch duct 52. A gas (to-be-measured gas) that contains ozone desorbed from the ozone adsorbent in the container 44 was introduced into the ozone analyzer 46 through the bypass duct 49, three-way valve 48, and duct 45. As this was done, the helium gas was added to the to-be-measured gas in the duct 45 through the duct 51 and the second branch duct 53 that is fitted with the mass-flow controller 55, whereby the rate of gas flow into the analyzer 46 was kept constant. In this state, the ozone concentration was measured by means of the analyzer 46, and the total amount of desorbed ozone was obtained and defined as an ozone adsorption amount.

Figure 4:
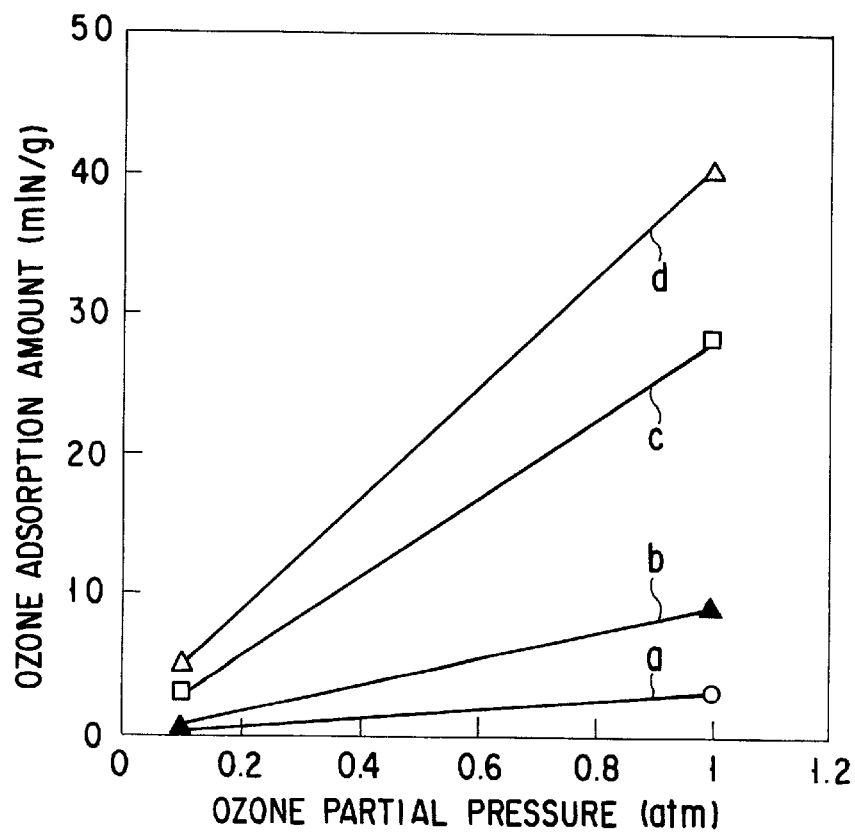
FIG. 4 is a graph showing relations between ozone partial pressure and ozone adsorption amount for various adsorbents used in Embodiment 1 of the invention.

FIG. 4 is a graph showing the respective ozone adsorption amounts of various adsorbents at 25° C. compared to ozone partial pressure. In FIG. 4, curves a, b, c and d represent the adsorption characteristics of silica gel, dealumination faujasite, mesoporous silicate, and high-silica pentasil zeolite, respectively.

As seen from FIG. 4, high-silica pentasil zeolite and mesoporous silicate are particularly excellent in ozone adsorption amount, and dealumination faujasite is superior to silica gel in this regard. In the case where the adsorption pressure and desorption pressure are set at 1 atm. and 0.1 atm., respectively, high-silica pentasil zeolite and mesoporous silicate are more suitable than dealumination faujasite, since the difference in ozone adsorption amount between the two materials shown in FIG. 4 corresponds to the ozone throughput.

Then, the respective openings of the first and second valves 42 and 47 were adjusted to set the ozone partial pressure of the ozone-containing gas at 0.1 atm., the temperature of the ozone adsorbent was changed from −60° C. to 30° C., and the ozone adsorption amount was obtained in the same other conditions. FIG. 5 is a graph showing relations between adsorption temperature and ozone adsorption amount for the individual adsorbents. In FIG. 5, curves a, b, c and d represent the adsorption characteristics of silica gel, dealumination faujasite, mesoporous silicate, and high-silica pentasil zeolite, respectively.

As seen from FIG. 5, high-silica pentasil zeolite and mesoporous silicate are particularly excellent in ozone adsorption amount, and dealumination faujasite is superior to silica gel in this regard. In the case where the adsorption temperature and desorption temperature are set at −60° C. and 30° C., respectively, high-silica pentasil zeolite and mesoporous silicate are more suitable than dealumination faujasite, since the difference in ozone adsorption amount between the two materials shown in FIG. 5 corresponds to the ozone throughput.

Embodiment 2

The three ozone adsorbents used in Embodiment 1, silica gel, dealumination faujasite, and mesoporous silicate, were loaded into the adsorbent container 44 of the tester of FIG. 3, the adsorption temperature was set at 25° C., and the ozone partial pressure of an ozone-containing gas for testing was kept at 0.1 atm. The ozone-containing gas was introduced into the container 44 without changing other conditions in the same manner as in Embodiment 1, ozone was detected by means of the ozone analyzer 46, and saturation of the ozone adsorbent was confirmed. Thereafter, the first and second valves 42 and 47 were closed and held closed for 30 minutes, 1 hour, 4 hours, and 8 hours. Then, with the first and second valves 42 and 47 closed, the third and fourth valves 50 and 54 were opened, and the three-way valve 48 was rotated so as to communicate with the duct 45. Helium gas was supplied to the adsorbent container 44 through the duct 51 and the first branch duct 52. A gas (to-be-measured gas) that contains ozone desorbed from the ozone adsorbent in the container 44 was introduced into the ozone analyzer 46 through the bypass duct 49, three-way valve 48, and duct 45, and the total amount of desorbed ozone was obtained. The ozone retention ratio was obtained as the ratio of the total amount of desorbed and recovered ozone to the total amount of ozone (ozone adsorption amount with adsorption balanced) introduced into the container 44. FIG. 6 shows relations between retention time and ozone retention ratio for the individual adsorbents at 25° C. In FIG. 6, curves a, b and c represent the characteristics of silica gel, dealumination faujasite, and mesoporous silicate, respectively.

The longer the retention time, as seen from FIG. 6, the lower the retention ratio is, and the more the ozone is decomposed. It is also indicated that dealumination faujasite, and mesoporous silicate are suited for the storage of ozone because they are lower in retention ratio reduction than silica gel.

The ozone retention ratio was obtained with the retention time varied in the same manner as aforesaid except for the changed adsorption temperature of −60° C. FIG. 7 shows the result of this calculation. In FIG. 7, curves a, b and c represent the characteristics of silica gel, dealumination faujasite, and mesoporous silicate, respectively.

As seen from FIG. 7, lowering of the ozone retention ratio with the passage of the retention time is gentler than in the case of FIG. 6 that shows the result of measurement at the adsorption temperature of 25° C. It is indicated, however, that the ozone retention ratio of silica gel is much lower than those of dealumination faujasite and mesoporous silicate, and that dealumination faujasite and mesoporous silicate can maintain a high ozone retention ratio as high as 92% after the passage of 8 hours. This implies that it is advisable to use dealumination faujasite and mesoporous silicate at the lowest possible adsorption temperature, in order to prevent ozone from being decomposed and lost, thereby improving the ozone recovery, in storing ozone for a long period of time.

Embodiment 3

Ten types of adsorbents with $SiO_2/Al_2O_3$ ratios of 15, 30, 100, 400, and 1,000 were prepared for high-silica pentasil zeolite, dealumination faujasite, and mesoporous silicate, and the relation between the $SiO_2/Al_2O_3$ ratio and ozone decomposition ratio was examined. After each ozone adsorbent was saturated by introducing ozone water with an ozone concentration of 10 ppm at 25° C. into the absorbent tank that was filled with 80 mL of adsorbent, the ozone concentration ($C_1$ ppm) of water discharged from the tank was measured, and the decomposition ratio was calculated according to the following expression:

Decomposition rate $(\%) = [(10 - C_1)/10] \times 100$

FIG. 8 shows the result of this calculation. In FIG. 8, curves b, c and d represent the characteristics of dealumination faujasite, mesoporous silicate and high-silica pentasil zeolite, respectively.

As seen from FIG. 8, the decomposition ratio falls within its practical range, 20% or below, when the $SiO_2/Al_2O_3$ ratio is 70 or above, preferably 100 or above, for high-silica pentasil zeolite and 20 or above, preferably 50 or above, for both dealumination faujasite and mesoporous silicate.

Embodiment 4

The adsorbent container 44 of the tester of FIG. 3 was loaded with mesoporous silicate that ensures a substantial ozone adsorption amount, and the adsorption temperature was set at 32° C. The first and second valves 42 and 47 were opened, while the third and fourth valves 50 and 54 were closed. In this state, the testing ozone-containing gas according to Embodiment 1 was introduced through the duct 43 into the adsorbent container 44 at a flow rate of 240 mLN/min, and ozone in the ozone-containing gas was adsorbed by the ozone adsorbent. Helium gas was added to the gas from the container 44 through the second branch duct 53 that is fitted with the duct 51 and the mass-flow controller 55. After it was diluted to 1/7, the gas was introduced into the ozone analyzer 46, whereupon its ozone concentration was measured.

Figure 9:
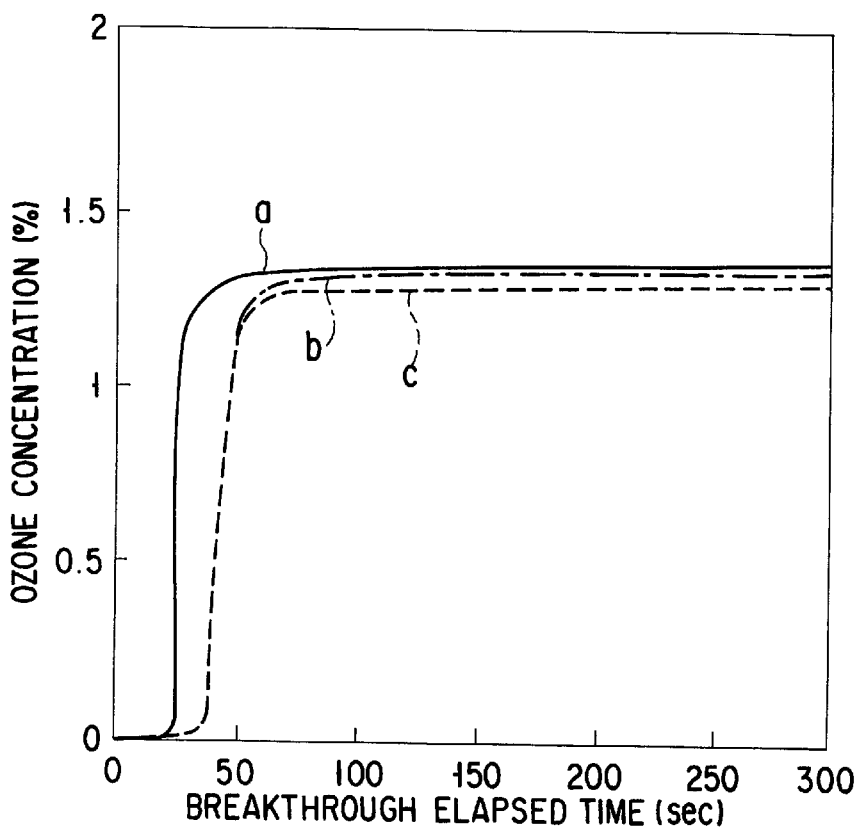
FIG. 9 is a graph showing breakthrough progress curves for mesoporous silicate used for ozone adsorption at 32° C. according to the invention.

FIG. 9 is a graph showing relations between breakthrough elapsed time and ozone concentration for the above process. FIG. 9 also shows the result of previous measurement of the change of ozone concentration in an empty-column state. An ozone breakthrough test was repeated three times. In FIG. 9, curves a, b and c represent ozone breakthrough characteristics corresponding to an empty-column value, a first-breakthrough value, and the average of second- and third-breakthrough values, respectively. In FIG. 9, moreover, the area between the empty-column ozone breakthrough curve a and the ozone breakthrough curves b and c for mesoporous silicate represents the ozone adsorption amount.

Figure 10:
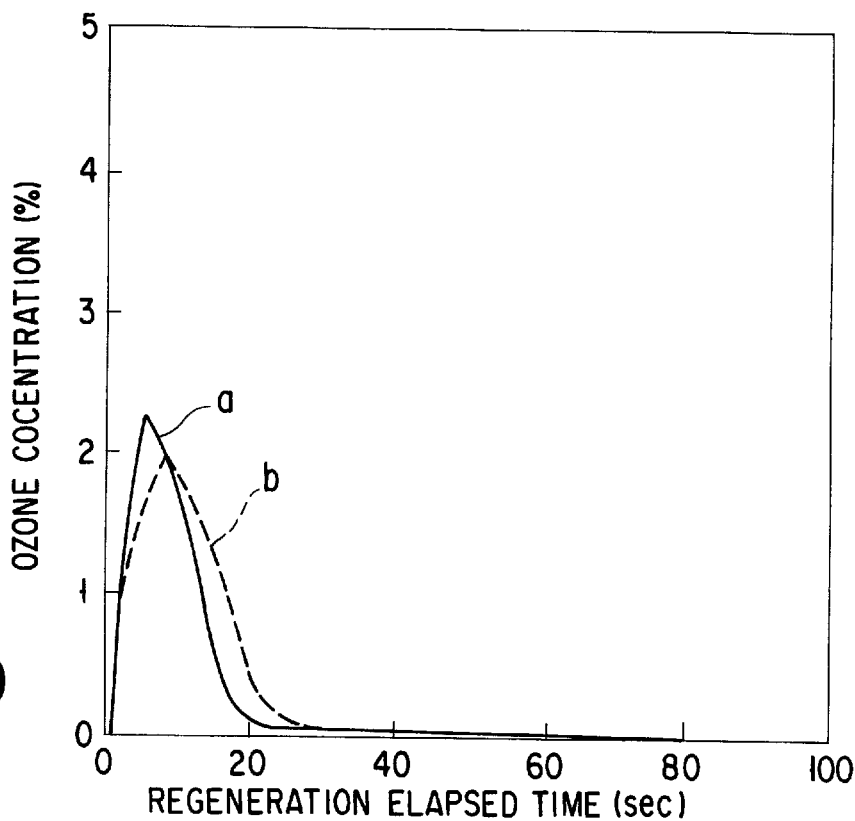
FIG. 10 is a graph showing regeneration progress curves for mesoporous silicate used for the ozone adsorption at 32° C. according to the invention.

After the ozone concentration was saturated, in the test described above, helium gas was supplied through the duct 51 and the first branch duct 52 to the adsorbent container 44 at a flow rate of 240 mLN/min. A gas (to-be-measured gas) that contains ozone desorbed from the ozone adsorbent in the container 44 was introduced into the ozone analyzer 46 through the bypass duct 49, three-way valve 48, and duct 45. The change of the ozone concentration corresponding to the regeneration elapsed time of the adsorbent was measured (dilution: 1/7). FIG. 10 is a graph showing progress of regeneration. In FIG. 10, curves a and b are progress curves that represent a value for a first regenerative cycle and the average of values for second and third regenerative cycles, respectively. In FIG. 10, moreover, the amount of ozone recovered by desorption is equivalent to the area between an empty-column regeneration progress curve and a regeneration progress curve for mesoporous silicate.

Since the ozone adsorption amount obtained from FIG. 9 and the recovered (desorbed) ozone amount obtained from FIG. 10 are substantially equal, the result of the test indicates that no substantial ozone was decomposed during the time interval between the ozone adsorption and desorption.

Figure 11:
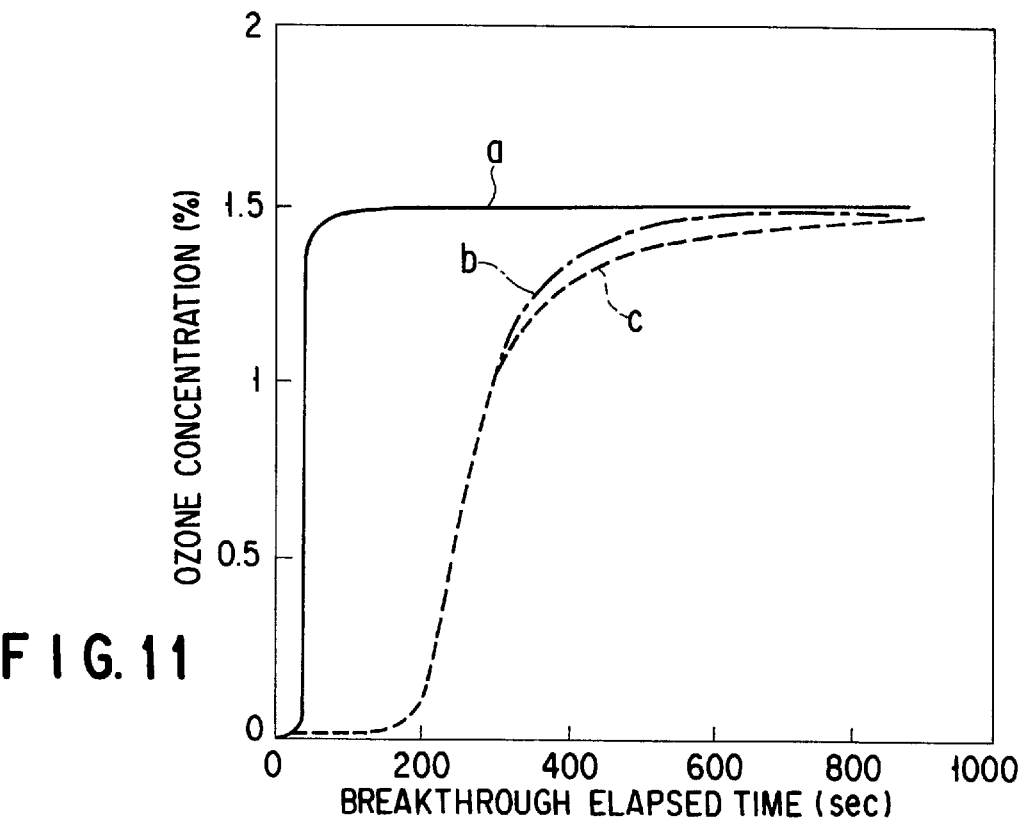
FIG. 11 is a graph showing breakthrough progress curves for mesoporous silicate used for ozone adsorption at –60° C. according to the invention.
Figure 12:
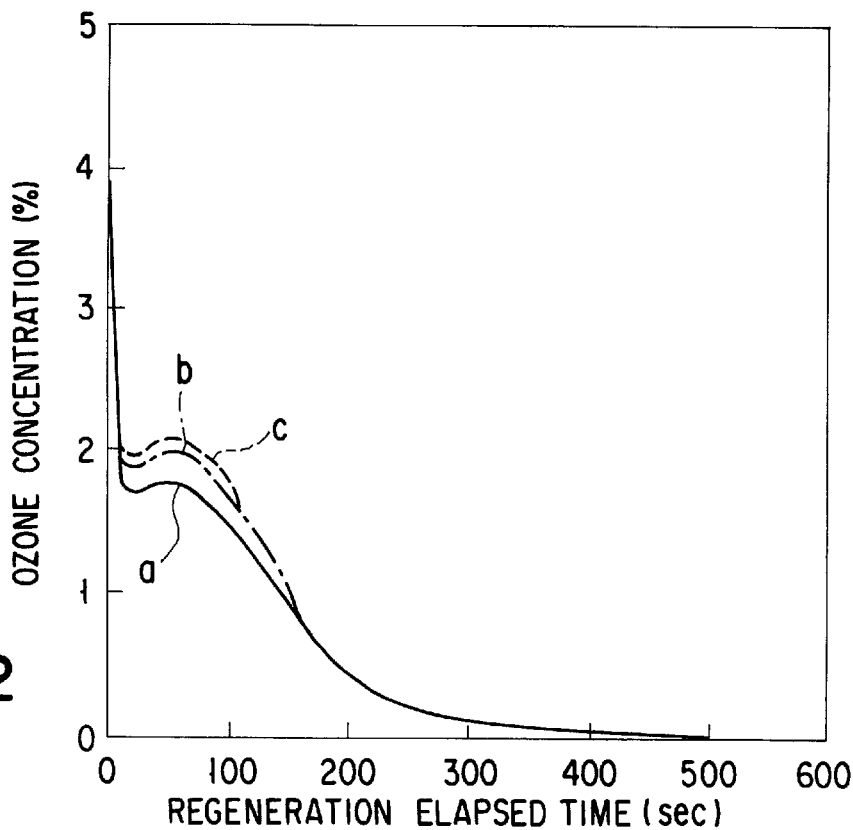
FIG. 12 is a graph showing regeneration progress curves for mesoporous silicate used for the ozone adsorption at –60° C. according to the invention.

FIGS. 11 and 12 are graphs showing ozone breakthrough and regeneration progress, respectively, obtained in the same manner as in the cases of FIGS. 9 and 10 except for the change of the adsorption temperature in the aforesaid breakthrough test from 32° C. to −60° C. In FIG. 11, curves a, b and c represent ozone breakthrough characteristics corresponding to an empty-column value, a first-breakthrough value, and the average of second- and third-breakthrough values, respectively. In FIG. 12, curves a, b, and c are progress curves that represent a value for an empty column, a value for a first regenerative cycle, and the average of values for second and third regenerative cycles, respectively.

Since the ozone adsorption amount obtained from FIG. 11 and the recovered (desorbed) ozone amount obtained from FIG. 12 are substantially equal, the result of the test also indicates that no substantial ozone was decomposed during the time interval between the ozone adsorption and desorption.

Embodiment 5

An ozone storage/recovery test was conducted by using the ozone storage/recovery system of FIG. 1.

The water-electrolysis ozone generator 1 having ozone production capacity of 1 kg/h was used. The ozone absorbent tank 2 was filled with 100 kg of mesoporous silicate that has the $SiO_2/Al_2O_3$ ratio of 1,000, and the tank 2 was cooled to −60° C. by means of the first cooler 3 (refrigerator) in the insulated container 5 that contains the tank 2 therein. Ozone was generated by operating the water-electrolysis ozone generator 1 for 8 hours from 10 p.m. to 6 a.m. the next day, using night electric power. The ozone-containing gas produced by the generator 1 contains 10 vol % of ozone, 87 vol % of oxygen, and 3 vol % of water. The compressor 15 was operated to introduce this gas through the ozone-containing gas supply pipe 12 into the ozone absorbent tank 2 at an adsorption pressure of 5 atm. and flow rate of 4.7 $m^3N/h$, whereupon the gas was adsorbed. The condensed oxygen gas discharged from the absorbent tank 2 was introduced through the condensed oxygen gas circulating duct 19 into the hydrogen-electrode chamber 8 of the ozone generator 1, whereupon oxygen depolarization was carried out. The oxygen depolarization resulted in a saving of electric power by about 35%.

During daytime use, the operations of the water-electrolysis ozone generator 1 and the first cooler 3 of the insulated container 5 were stopped, and air (purging gas) of 30° C. was supplied through the purging gas supply pipe 18 to the top portion of the ozone absorbent tank 2 at a pressure of 1 atm. and flow rate of 2 $m^3N/h$. Thereupon, a gas with an ozone concentration of 23.5 vol % was able to be continuously recovered through the ozone recovery duct 23 at a flow rate of 2 $m^3N/h$ for 8 hours.

According to the present invention, as described herein, there may be provided an ozone storage/recovery method, which uses an ozone adsorbent contained of a specific high-silica material that has high ozone adsorptivity, high ozone retention ratio, and low ozone decomposition ratio even in a watery system and is suited for ozone storage, so that ozone produced with use of low-priced electricity, such as night electric power, can be stored in large quantities in a compact storage device and taken out at a high recovery when necessary.

According to the invention, moreover, there may be provided an ozone storage/recovery system, which can produce ozone with use of low-priced electricity, such as night electric power, store it, and when necessary, recover and supply it, thus enjoying lower running cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ozone storage/recovery method comprising:
   a process for supplying an ozone-containing gas, generated by an ozone generator, to an ozone adsorbent tank filled with an ozone adsorbent contained at least one high-silica material selected from the group consisting of a high-silica pentasil zeolite having a $SiO_2/Al_2O_3$ ratio of 70 to 100, a dealumination faujasite having a $SiO_2/Al_2O_3$ ratio of about 20 to 400 and a mesoporous silicate, causing the adsorbent to adsorb ozone at a temperature of 0° C. or below, and storing the ozone; and
   a process for desorbing the ozone adsorbed by the adsorbent in said ozone adsorbent tank and recovering the ozone from said adsorbent tank.

2. A method according to claim 1, wherein a low-temperature condensed oxygen gas discharged from said ozone adsorbent tank is used to precool the ozone-containing gas supplied to said adsorbent tank.

3. A method according to claim 1, wherein said ozone storage process includes setting the temperature of the adsorbent at −60° C. to −30° C. and causing the adsorbent to adsorb ozone, and said ozone recovery process includes adjusting the adsorbent to a temperature from above 0° C. to 30° C. and desorbing the ozone from the adsorbent by heating.

4. A method according to claim 1, wherein said ozone recovery process includes supplying a purging gas, heated to a desired temperature, to said ozone adsorbent tank in the direction opposite to the flow of the ozone-containing gas and desorbing the ozone from the adsorbent by heat purging.

5. A method according to claim 1, wherein said ozone storage process includes setting the pressure in said adsorbent tank at 1 atm to 5 atm and causing the adsorbent to adsorb ozone, and said ozone recovery process includes setting the pressure in said adsorbent tank to 0.3 atm or below and desorbing the ozone from the adsorbent by pressure reduction.

6. A method according to claim 1, wherein said ozone storage process includes setting the pressure in said adsorbent tank at 1 atm to 5 atm and causing the adsorbent to adsorb ozone, and said ozone recovery process includes setting the pressure in the adsorbent tank to 0.04 atm to 0.3 atm, supplying a desired purging gas to said ozone adsorbent tank in the direction opposite the flow of said ozone-containing gas, and desorbing the ozone from the adsorbent by reduced-pressure purging.

7. A method according to claim 6, wherein said purging gas is heated to a desired temperature.

8. A method according to claim 1, wherein said ozone generator is a water-electrolysis ozone generator designed so that a low-temperature condensed oxygen gas discharged from said ozone adsorbent tank is introduced into a hydrogen-electrode chamber of said water-electrolysis ozone generator to effect oxygen depolarization.

9. A method according to claim 1, wherein said ozone generator is a silent-discharge ozone generator designed so that a condensed oxygen gas discharged from said ozone adsorbent tank is returned to the oxygen raw supply side of said silent-discharge ozone generator.

10. A method according to claim 1, wherein said mesoporous silicate has a $SiO_2/Al_2O_3$ ratio of 20 to those substantially consisting of $SiO_2$ alone.

* * * * *